United States Patent Office 3,711,390
Patented Jan. 16, 1973

3,711,390
PHOTOPOLYMERIZABLE EPOXY SYSTEMS CONTAINING SUBSTITUTED CYCLIC AMIDES OR SUBSTITUTED UREAS AS GELATION INHIBITORS
Jacob Howard Feinberg, 1 Stanford Court, Hightstown, N.J. 08520
No Drawing. Filed May 18, 1971, Ser. No. 144,666
Int. Cl. B01j *1/10, 1/12*
U.S. Cl. 204—159.11
29 Claims

ABSTRACT OF THE DISCLOSURE

Polymerization of epoxide monomers and prepolymers, and of other materials polymerizable through the action of cationic catalysts, is controlled by providing, in association with a radiation-sensitive catalyst precursor, a gelation inhibitor in the form of a substituted acyclic amide or a substituted urea, such as N,N-dimethylacetamide and 1,1,3,3-tetramethylurea.

BACKGROUND OF THE INVENTION

When a flowable liquid composition is applied to a substrate to form a coating or decoration, or to provide graphic or other information, it may be advantageous shortly after application to obtain rapid hardening, gelling, or curing of the coated material by irradiation for a brief period of time. This is particularly advantageous if the liquid coating composition is substantially free of volatile solvents which do not themselves participate in the curing, since the hardening then may be effected very rapidly without interference from evolving vapors and without producing waste gases. Practical coating systems of these types have been developed, utilizing photosensitive latent curing catalysts which respond to irradiation by releasing the catalytic agent.

One such coating system utilizes epoxide compounds (or mixtures) of relatively low molecular weight, which may be formulated to provide good flow characteristics with or without the use of inert solvents. Cationic polymerization catalysts cause the epoxy ring to open through cleavage of a carbon-oxygen bond, forming a cationic reactive intermediate. The reaction thus initiated may repeat itself rapidly many times in a chain reaction to form a polymer of repeating ether units. Gelling time for such photosensitive catalytic polymerization may be short enough to provide a substantially hardened coating a short distance after irradiation is carried out while the substrate passes at high speed along a treatment line.

The advantages of such radiation-responsive catalytic polymerization are made apparent by comparison with other available systems. Polymerization and crosslinking of epoxide compounds have been carried out by a variety of methods; see, for example, chapter 5 of "Handbook of Epoxy Resins" by H. Lee and K. Neville, McGraw-Hill Book Company, 1967. A disadvantage of many of the so-called curing reactions is that they begin immediately on mixing reactants. Many of the curing techniques are based on two-component systems in which the two components must be isolated from each other until the curing reaction is to take place. Thus, only that quantity of material is mixed which can be used at once. Many of the curing reactions are slow and are unsuitable for applications which require a rapid transformation from the liquid or thermoplastic state to the solid state. Heat is frequently applied to stimulate or expedite reactions, but this is especially undesirable in applications where the epoxide material is in contact with a heat-sensitive material or where the reduction in viscosity on heating would cause "run-off" of the resin before curing takes place. Careful attention must be given to staying within the temperature limitations of the system involved. In order to prevent harmful effects of thermal curing, it is often necessary to extend the curing cycle an unreasonable length of time.

However, epoxide and related compositions containing photosensitive catalyst precursors have a tendency to gel upon standing, even in the absence of light or ultraviolet radiation. This tendency to undergo premature reaction is particularly troublesome in the case of formulations which are substantially free of unreactive diluents or solvents. The polymerization reaction is exothermal and, where large masses are involved, can generate sufficient heat to cause combustion of the epoxide resins.

SUMMARY OF THE INVENTION

Accordingly, new and improved stabilized polymerizable compositions are provided containing radiation-sensitive catalyst precursors and also gelation inhibitors which, upon admixture with the polymerizable monomers and prepolymers, inhibit gelation of the reactive composition prior to irradiation. This is accomplished by the inclusion of a small quantity of one or more substituted ureas or acyclic amides as gelation inhibitors. Such compositions may have greatly extended storage or pot life, premature reaction in the dark or at minimal levels of radiation being inhibited so that the mixtures may be retained for periods of days or more before application. Thus, in accordance with the process of the invention, a mixture first is formed of the polymerizable material, a Lewis acid catalyst precursor, and the urea or amide inhibitor. The resulting mixture, at a convenient time subsequently, is subjected to application of energy, such as actinic or electron beam irradiation, to release the Lewis acid catalyst in sufficient amounts to initiate the desired polymerization reaction.

DETAILED DESCRIPTION

Any monomeric or prepolymeric material, or mixture of such materials, of suitable viscosity or suitable miscibility in solvents, which is polymerizable to higher molecular weights through the action of a cationic catalyst, may be utilized in the process and compositions of the present invention. In a preferred embodiment, any polymerizable, monomeric or prepolymeric epoxide material or mixture of such epoxide materials, of suitable viscosity alone or when dissolved in a suitable solvent, may be utilized. The classic epoxy resin is obtained by the well known reaction of epichlorohydrin and bisphenol A (4,4'-isopropylidenediphenol). The reaction product is believed to have the form of a polyglycidyl ether of bisphenol A (the glycidyl group being more formally referred to as the 2,3-epoxypropyl group) and thus may be thought of as a polyether derived from the diphenol and glycidol (2,3-epoxy-1-propanol). The structure usually assigned to the resinous product is

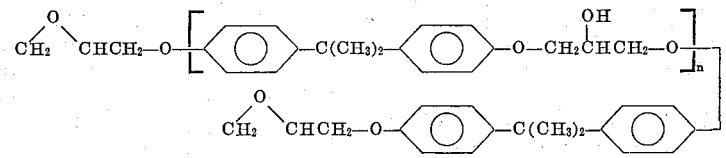

A viscous liquid epoxy resin, average molecular weight about 380, is obtained by reacting the epichlorohydrin in high molecular proportion relative to the bisphenol A, the reaction product containing well over 85 mole percent of the monomeric diglycidyl ether of bisphenol A ($n=0$), which may be named 2,2-bis[p-(2,3-epoxypropoxy)phenyl]propane, and smaller proportions of polymers in which $n$ is an integer equal to 1, 2, 3, etc. This product exemplifies epoxide monomers and prepolymers, having a moderate molecular weight, preferably of the order of 1,000, or less, which may be cross-linked or otherwise polymerized in accordance with the invention, whereby cleavage of the terminal epoxy or oxirane rings is initiated by the action of the Lewis acid halide released when energy is applied to the latent polymerization catalyst.

Many other epoxide materials are available in polymerizable monomeric or prepolymeric forms. Among these are 1,2-epoxycyclohexane (cyclohexene oxide, also named 7 - oxabicyclo[4.1.0]heptane); and vinylcyclohexene dioxide, more specifically named 3-(epoxyethyl)-7-oxabicyclo[4.1.0]heptane or 1,2-epoxy-4-(epoxyethyl)cyclohexane. Ethylene oxide (oxirane,

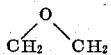

the simplest epoxy ring) and its homologues generally, e.g., propylene oxide (1,2-epoxypropane) and 2,3-epoxybutane, are themselves useful; other useful epoxidic cyclic ethers are the $C_3O$ ring compound trimethylene oxide (oxetane), derivatives thereof such as 3,3-bis(chloromethyl)oxetane (also named 2,2 - bis(chloromethyl) - 1,3 - epoxypropane), and the $C_4O$ ring compound tetrahydrofuran, as examples. Other epoxidized cycloalkenes may be used, a readily available polycyclic diepoxide being dicyclopentadiene dioxide, more specifically identified as 3,4 - 8,9 - diepoxytricyclo[5.2.1.0$^{2,6}$]decane. A suitable polyfunctional cyclic ether is 1,3,5-trioxane.

Glycidyl esters of acrylic acid and of its homologs, methacrylic acid and crotonic acid, are vinyl epoxy monomers of particular interest. Other such monomers are allyl glycidyl ether (1-allyloxy-2,3-epoxypropane) and glycidyl phenyl ether (1,2-epoxy-3-phenoxypropane). Another readily available product is a mixture of ethers of the structure

where R is alkyl, that is, glycidyl alkyl ethers. One such mixture contains predominantly glycidyl octyl ether and decyl glycidyl ether; another contains dodecyl glycidyl ether and glycidyl tetradecyl ether. Epoxidized novolak prepolymers likewise may be used, as well as polyolefin (e.g., polyethylene) epoxides. The latter are exemplified by epoxidized, low molecular weight by-products of the polymerization of ethylene, which may be separated as mixtures high in 1-alkenes in the range from about 10 to 20 carbon atoms, that is from about 1-decene to about 1-eicosene. Epoxidation then provides mixtures of the corresponding 1,2-epoxyalkanes, examples being mixtures high in the 1,2-epoxy derivatives of alkanes having 11 to 14 carbons, or having 15 to 18 carbons.

Esters of epoxidized cyclic alcohols, or of epoxidized cycloalkanecarboxylic acids, or of both, provide useful epoxide or polyepoxide materials. Thus a suitable ester of epoxidized cyclohexanemethanol and epoxidized cyclohexanecarboxylic acid is the diepoxide (3,4-epoxycyclohexyl)methyl 3,4-epoxycyclohexanecarboxylate; this same ester may be indexed under the name 7-oxabicyclo[4.1.0]hept-3-ylmethyl 7-oxabicyclo[4.1.0]heptane-3-carboxylate. Another suitable diepoxide may be obtained as an ester of a substituted (epoxycycloalkyl)methanol and a dibasic acid, for example, bis[(3,4-epoxy-6-methylcyclohexyl)methyl]adipate, which may be named alternatively bis[(4-methyl-7-oxabicyclo[4.1.0]hept-3-yl)methyl] adipate. Diepoxide monomeric materials may be obtained conveniently as bis(epoxyalkyl) ethers of glycols, an example being the diglycidyl ether of 1,4-butanediol, that is, 1,4-bis-(2,3-epoxypropoxy)butane. This diepoxide is related to the diglycidyl ether of bisphenol A, shown above as 2,2-bis[p-(2,3-epoxypropoxy)phenyl]propane.

Lactones tend to be readily polymerizable under the action of a cationic catalyst such as a Lewis acid. Thus beta-propiolactone and epsilon-hexanolactone (epsilon-caprolactone) may be used in the process and compositions of the present invention.

Further, the polymerization of ethylenic materials likewise may be initiated by cationic catalysts. Examples of this type of polymerizable materials are styrene, isobutyl vinyl ether, and 9-vinylcarbazole. Diketene is both ethylenic (viewed as 4-methylene-2-oxetanone) and a lactone (viewed as the beta-lactone of 3-butenoic acid).

The materials utilized as latent polymerization initiators in the process and compositions of the present invention are radiation-sensitive catalyst precursors which decompose to provide a Lewis acid upon application of energy. The energy required for effective decomposition may be thermal energy, applied simply by heating, or may be energy applied by bombardment with charged particles, notably by high-energy electron beam irradiation. Preferably, however, the catalyst precursors are photosensitive, and the required energy is imparted by actinic irradiation, which is most effective at those regions of the electromagnetic spectrum at which there is high absorption of electromagnetic energy by the particular catalyst precursor used. More than one of these types of energy may be applied to the same system; e.g., ultraviolet light irradiation followed by electron beam irradiation, and post-heating also may be employed, although irradiation ordinarily can effect a suitable cure.

The preferred photosensitive Lewis acid catalyst precursors are aromatic diazonium salts of complex halogenides, which decompose upon application of energy to release a halide Lewis acid. The aromatic diazonium cation may be reperesented generally as

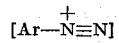

where the aryl group Ar, which may be an alkaryl hydrocarbon group, is bonded to the diazonium group by replacing one of the hydrogen atoms on a carbon atom of the aromatic nucleus, and where the aryl group ordinarily carries at least one pendant substituent for greater stability of the cation. Thus the pendant substituent may be alkyl, or another substituent, or both. The complex halogenide anion may be represented by $[MX_{n+m}]^{-m}$. Thus, the photosensitive salt and its decomposition upon actinic irradiation may be depicted as follows:

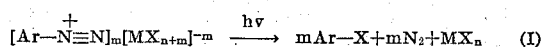

where X is the halogen ligand of the complex halogenide, M is the metallic or metalloid central atom thereof, $m$ is the net charge on the complex halogenide ion, and $n$ is the number of halogen atoms in the halide Lewis acid compound released. The Lewis acid halide $MX_n$ is an electron pair acceptor, such as $FeCl_3$, $SnCl_4$, $PF_5$, $AsF_5$, $SbF_5$, and $BiCl_3$, which upon suitable irradiation of the diazonium complex salt is released in substantial quantities and initiates or catalyzes the polymerization process, wherein the monomeric or prepolymeric material is polymerized or cured as the result of the actinic irradiation.

The diazonium compounds of the present invention may be prepared using procedures known in the art, and such preparation forms no part of the present invention. Thus, for example, chlorometallic halogenide complexes may be prepared in accordance with the method set forth by Lee et al., in Journal of the American Chemical Society, 83, 1928 (1961). Exemplifying a procedure of general utility, arenediazonium hexafluorophosphates can be prepared by diazotizing the corresponding aniline with $NOPF_6$, made by combining HCl and $NaNO_2$ with subsequent addition of hydrogen hexafluorophosphate ($HPF_6$) or of a hexafluorophosphate salt, or they can be prepared by addition of a hexafluorophosphate salt to another diazonium salt to effect precipitation. As a further example, various morpholinoaryl complexes, containing the group

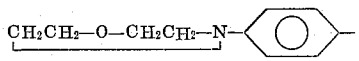

can be prepared either from the aniline derivative or by adding an aqueous solution of a metal salt of the desired complex halogenide to a solution of morpholinobenzenediazonium tetrafluoroborate.

Illustrative of the aromatic diazonium cations comprised in the photosensitive catalyst salts utilized in accordance with the present invention are the following:

p-chlorobenzenediazonium
2,4-dichlorobenzenediazonium
2,5-dichlorobenzenediazonium
2,4,6-trichlorobenzenediazonium
2,4,6-tribromobenzenediazonium
o-nitrobenzenediazonium
p-nitrobenzenediazonium
4-nitro-o-toluenediazonium (2-methyl-4-nitrobenzenediazonium)
2-nitro-p-toluenediazonium (4-methyl-p-nitrobenzenediazonium)
6-nitro-2,4-xylenediazonium (2,4-dimethyl-6-nitrobenzenediazonium)
2-chloro-4-(dimethylamino)-5-methoxybenzenediazonium
4-chloro-2,5-dimethoxybenzenediazonium
2,4′,5-triethoxy-4-biphenyldiazonium (2,5-diethoxy-4-(p-ethoxyphenyl)benzenediazonium)
2,5-dimethoxy-4′-methyl-4-biphenyldiazonium (2,5-dimethoxy-4-(p-tolyl)benzenediazonium)
2,5-diethoxy-4-(phenylthio)benzenediazonium
2,5-diethoxy-4-(p-tolylthio)benzenediazonium
p-morpholinobenzenediazonium
2,5-dichloro-4-morpholinobenzenediazonium
2,5-dimethoxy-4-morpholinobenzenediazonium
4-(dimethylamino)-1-naphthalenediazonium Illustrative of the complex halogenide anions comprised in the photosensitive catalyst salts utilized in accordance with the present invention are the following:

tetrachloroferrate(III), $FeCl_4^-$
hexachlorostannate(IV), $SnCl_6^{2-}$
tetrafluoroborate, $BF_4^-$
hexafluorophosphate, $PF_6^-$
hexafluoroarsenate(V), $AsF_6^-$
hexafluoroantimonate(V), $SbF_6^-$
hexachloroantimonate(V), $SbCl_6^-$
pentachlorobismuthate(III), $BiCl_5^{2-}$ A selection of aromatic diazonium salts of complex halogenides is listed in Table I. Many of the salts listed have been found to be well adapted or superior for use as latent photosensitive polymerization initiators in the process and compositions of the present invention, based on thermal stability, on solubility and stability in the epoxy formulations and solvents (if any) used, on photosensitivity, and on ability to effect polymerization with the desired degree of curing after adequate actinic irradiation. Following the name of each aromatic diazonium halogenide is its melting point or decomposition temperature in degrees centigrade, and wavelengths of electromagnetic radiation, in nanometers, at which its exhibits absorption maxima.

TABLE I

| | M.P., °C. | Abs'n max., nm. |
|---|---|---|
| 2,4-dichlorobenzenediazonium tetrachloroferrate (III) | 62–64 | 259, 285, 360 |
| p-Nitrobenzenediazonium tetrachloroferrate (III) | 93–95 | 243, 257, 310, 360 |
| p-Morpholinobenzenediazonium tetrachloroferrate (III) | 121.5 | 240, 267, 313, 364 |
| 2,4-dichlorobenzenediazonium hexachlorostannate (IV) | 190 | 285 |
| p-Nitrobenzenediazonium hexachlorostannate (IV) | 126 | 258, 310 |
| 2,4-dichlorobenzenediazonium tetrafluoroborate | 152 | 285, [2] 325–340 |
| p-Chlorobenzenediazonium hexafluorophosphate | 162–164 | 273 |
| 2,5-dichlorobenzenediazonium hexafluorophosphate | [1] 140 | 264, 318 |
| 2,4,6-trichlorobenzenediazonium hexafluorophosphate | 240–250 | 294, 337 |
| 2,4,6-tribromobenzenediazonium hexafluorophosphate | 245–260 | 306 |
| p-Nitrobenzenediazonium hexafluorophosphate | 156 (178) | 258, 310 |
| o-Nitrobenzenediazonium hexafluorophosphate | 161.5 | |
| 4-nitro-o-toluenediazonium hexafluorophosphate | 123 (138) | 262, 319 |
| 2-nitro-p-toluenediazonium hexafluorophosphate | 164–165 | 286 |
| 6-nitro-2,4-xylenediazonium hexafluorophosphate | 150 | 237, 290 |
| p-Morpholinobenzenediazonium hexafluorophosphate | 162 (181) | 377 |
| 4-chloro-2,5-dimethoxybenzenediazonium hexafluorophosphate | 168–169 (198–208) | [2] 243, 287, 392 |
| 2,5-dimethoxy-4-morpholinobenzenediazonium hexafluorophosphate | [3] 135 | 266, 396 |
| 2-chloro-4-(dimethylamino)-5-methoxybenzenediazonium hexafluorophosphate | 111 | 273, 405 |
| 2,5-dimethoxy-4-(p-tolylthio)benzenediazonium hexafluorophosphate | 146 (155) | 358, 400 |
| 2,5-diethoxy-4-(p-tolylthi)benzenediazonium hexafluorophosphate | 147 (150) | [2] 223, 247, 357, 397 |
| 2,5-dimethoxy-4′-methyl-4-biphenyldiazonium hexafluorophosphate | 167 | 405 |
| 2,4′,5-triethoxy-4-biphenyldiazonium hexafluorophosphate | 136 | 265, 415 |
| 4-(dimethylamino)-1-naphthalenediazonium hexafluorophosphate | 148 | 280, 310, 410 |
| p-Nitrobenzenediazonium hexafluoroarsenate(V) | 141–144 (161) | 257, 310 |
| p-Morpholinobenzenediazonium hexafluoroarsenate(V) | 162 (176–177) | 250, 378 |
| 2,5-dichlorobenzenediazonium hexafluoroantimonate(V) | 161–162.5 | 238, 358 |
| p-Nitrobenzenediazonium hexafluoroantimonate(V) | 140–141 | 257, 308 |
| p-Morpholinobenzenediazonium hexafluoroantimonate(V) | 153 (177.5–180.5) | 254, 374 |
| 2,4-dichlorobenzenediazonium hexachloroantimonate(V) | 178–180 | 279, [2] 322 |
| 2,4-dichlorobenzenediazonium pentachlorobismuthate(III) | 193.5–195 | 285, 313 |
| o-Nitrobenzenediazonium pentachlorobismuthate(III) | 166.5–168 | 285, 313 |

[1] Decomposes.
[2] Shoulder.
[3] Above.

The melting points given in Table I were determined generally by the usual visual capillary tube method; in most cases discoloration began below the observed melting point temperature with frothing decomposition at that temperature. In some cases melting points or exotherms were determined also by differential thermal analysis under nitrogen gas, and the temperatures so determined are given in parentheses. The wavelengths of absorption maxima in the ultraviolet-to-visible range were determined with the diazonium complex salt dissolved in acetonitrile.

In accordance with the present invention, amides having an acyclic amido group, or urea derivatives, wherein the amido group

and the urea nitrogen atoms

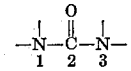

are free of unsubstituted hydrogen, are used in stabilizing amounts as gelation inhibitors for polymerizable compositions. Thus, in the representations of the amido functional group

and the urea functional group

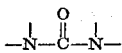

with the positions of substituents indicated generally by lines representing interatomic bonds, none of these bonds may be a bond to a free hydrogen atom. The lines in these representations are simply schematic and are not intended to imply any other limitations in the nature or positions of the various interatomic bonds. Accordingly, referring to the substituents on the nitrogen atoms, these substituents may be any suitable groups such as alkyl, cycloalkyl, aryl, aralkyl, alkaryl, halo, etc., and substituents may be joined to each other, for example, to form a divalent chain such as a polymethylene group, the choice of substituents being limited only by the requirement that the substituted urea or acyclic amide be substantially inert, in the quantities used, to the other components of the polymerizable compositions.

Notable among the substituted acyclic amides utilized in accordance with the present invention is N,N-dimethylacetamide,

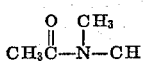

wherein each of the substituents on the carbonyl carbon atom of the amido group and on the amido nitrogen atom is a methyl group. Additional examples are:

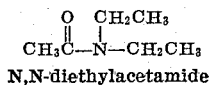
N,N-diethylacetamide

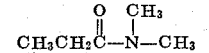
N,N-dimethylpropionamide

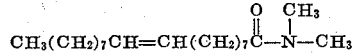
N,N-dimethyloleamide (N,N,-dimethyl-9-octadecenamide)

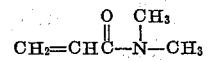
N,N-diethylacrylamide

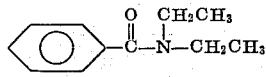
N,N-diethylbenzamide

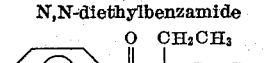
N,N-diethyl-m-toluamide

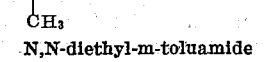
N-ethyl-N-(1-naphthyl)acetamide

1-acetylpiperidine

It is noted that the amido carbon atom is not part of the cyclic structure in N-acyl-substituted nitrogen-containing heterocycles such as a 1-acyl-piperidine, wherein the N-acyl substituent forms an acyclic amido group.

Also useful as the acyclic amide are polymers formed from an N-vinyl-substituted amide such as N-methyl-N-vinylacetamide,

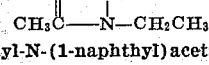

the polymeric structure presumably being

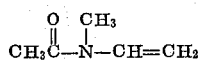

Such a polymer provides amide molecules which are polyfunctional with respect to the acyclic amido structure, one substituent on each amido nitrogen atom being a methyl group and the other substituent including an alkylene linkage to each of the adjacent amido nitrogen atoms in the polymeric chain.

Illustrative of the substituted urea compounds utilized in accordance with the present invention are the following 1,1,3,3-tetrasubstituted ureas:

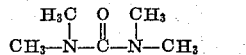
1,1,3,3-tetramethylurea

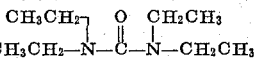
1,1,3,3-tetraethylurea

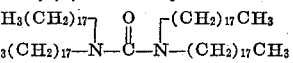
1,1,3,3-tetraoctadecylurea

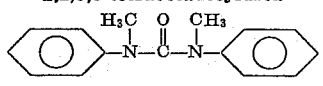
N,N'-dimethylcarbanilide

An example of a urea derivative in which each urea nitrogen atom is a member of a heterocycle is 1,1'-carbonyldipiperidine (1,1-3,3-di(pentamethylene)urea),

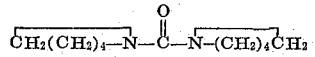

An alkylene group may link the two urea nitrogen atoms, as in 1,3-dimethyl-2-imidazolidinone,

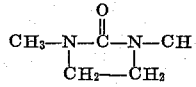

A related compound which is difunctional with respect to the substituted urea group, and which contains two fused, saturated imidazole rings, is 1,3,4,6-tetrachloroglycoluril,

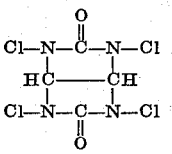

As discussed in some detail herein, several components—namely, the polymerizable material, the catalyst precursor, and the gelation inhibitor—are provided in admixture in the stabilized polymerizable compositions of the present invention. It will be appreciated that these several components should be compatible with each other in the sense of substantial freedom from mutual chemical attack during storage prior to irradiation. Moreover, the three components also should be compatible in the sense of mutual physical affinity. Thus, it would not be preferable to provide either the gelation inhibitor or the catalyst precursor in the mixture in the form of undissolved solid particles distributed therethrough, even though such solid particles might perform to some degree their intended functions, respectively, of counter-activity against prematurely formed Lewis acid, and of release of the Lewis acid catalyst upon eventual irradiation. For example, the relative insolubility of the higher molecular weight polyamides, such as most nylon and peptide materials, makes them unattractive or impractical as gelation inhibitors.

Referring to Equation I hereinabove showing the photolytic decomposition of the catalyst precursor, the halide Lewis acid $MX_n$ released reacts with the epoxide or other polymerizable material with a result exemplified by the following:

$$ArN_2M(X_{n+1}) + \text{monomer} \xrightarrow{\text{radiation}} \text{polymer} \qquad (II)$$

The cationic catalyst is believed to act by cleaving a carbon-oxygen epoxy bond, or by opening the double bond in a vinyl (ethylenic) monomer, initiating growth of a polymeric chain or permitting formation of a cross-linkage. A general application of the process embodied by Equations I and II can be as follows: a diazonium complex salt, for example, as identified hereinabove, is admixed, with or without the use of a suitable solvent, with an epoxy monomer and, as stabilizer, with a quantity of a tetra-substituted urea, or an acyclic amide having substituents on the carbon and nitrogen atoms of the amido group. The mixture is thereafter coated on a suitable substrate such as a metal plate, plastic, or paper, and the substrate is exposed to ultraviolet or electron beam radiation. On exposure the diazonium compound decomposes to yield the Lewis acid catalyst, which initiates the polymerization of the epoxy monomer. The resulting polymer is resistant to most solvents and chemicals.

The source of radiation for carrying out the method of the present invention can be any suitable source, such as the ultraviolet actinic radiation produced from a mercury, xenon, or carbon arc, or the electron beam produced in a suitably evacuated cathode ray gun. The only limitation placed on the radiation source used is that it must have an energy level at the irradiated film sufficient to impart to the polymerizable system energy at an intensity high enough to reach the decomposition level of the photosensitive compounds. As previously noted, the wavelength (frequency) range of actinic radiation is chosen to obtain sufficient absorption of energy to excite the desired decomposition.

For an imaging system, the mixture, which may contain a suitable solvent in substantial proportions, is coated on a metal plate, dried if necessary to remove solvent present, and the plate is exposed to ultraviolet light through a mask or negative. The light initiates polymerization which propagates rapidly in the exposed image areas. The resulting polymer in the exposed areas is resistant to many or most solvents and chemicals, while the unexposed areas can be washed with suitable solvents to leave a reversal image of an epoxy polymer in this embodiment.

The polymers produced by the polymerizing process of the present invention are useful in a wide variety of applications in the field of graphic arts, due to their superior adhesion to metal surfaces, excellent resistance to most solvents and chemicals, and capability of forming high resolution images. Among such uses are photoresists for chemical milling, gravure images, offset plates, stencil-making, micro-images for printed circuitry, thermoset vesicular images, micro-images for information storage, decoration of paper, glass, and packages, and light-cured coatings.

The procedures for mixing the stabilized radiation-sensitive compositions of the present invention using epoxide materials, for example, are relatively simple. The monomer or prepolymer resin, or polymerizable mixture thereof, is combined with the catalyst precursor and the substituted acyclic amide or substituted urea inhibitor, if desired with a suitable inert volatile solvent. By such a suitable solvent is meant any solvent compound or mixture which boils below about 190° C. and which does not react appreciably with the monomer, the catalyst precursor, or the inhibitor. Examples of such solvents include acetone, toluene, methyl ethyl ketone, ethyl ether, anisole, dimethyl ether of diethylene glycol (bis(2-methoxyethyl) ether), monochlorobenzene, 1,1,2,2-tetrachloroethane, o-chlorotoluene, o-dichlorobenzene, and trichloroethylene or mixtures thereof.

The amount of catalyst precursor employed should be sufficient to insure complete polymerization. It has been found that quite satisfactory results are obtained by providing a diazonium complex salt in amount by weight from about 0.5% to about 5% of the catalyst precursor relative to the weight of the polymerizable material provided, about 1% or less being amply effective with some epoxide-catalyst precursor systems.

The amount of the acyclic amide or substituted urea needed for the desired stabilizing effect is determined readily for given ingredients, using simple tests performed quite readily by the skilled formulator, preferably covering a range of test proportions to determine storage or pot life as a function of inhibitor proportion. A convenient test procedure involves viscometer measurements after storage in the dark for a period as long as the maximum storage life needed for the operations in which the stabilized mixed polymerizable composition is to be used. Most coating and printing operations, for example, can utilize formulations having a viscosity within a substantial predetermined range, whether a relatively low-viscosity or high-viscosity range, and use of the inhibitor can maintain the formulations within the desired viscosity ranges for a much longer period. The viscosity of the freshly prepared mixture, even if solvent-free, is low enough in some cases to permit quite substantial polymerization before the composition becomes too viscous to be usable.

The examples set out hereinbelow will indicate the range of proportions within which the urea or amide inhibitor usually is required. Considerably less than 0.05% by weight of the inhibitor, relative to the weight of the entire polymerizable composition, can be markedly effective for many days of storage, while amounts over 0.5% by weight seldom are needed. In general, the inhibitor preferably is present in an amount by weight equal to between about 0.005% and about 1% of the weight of the composition. Excessive amounts of inhibitor might impair the stability. It should be kept in mind that unnecessarily large amounts of the inhibitor can decrease quite markedly the catalytic potential of the catalyst precursor, and even may poison the catalyst to the extent that substantial or sufficient curing cannot occur in a reasonable length of time after application of energy to the composition. For this reason, provision of the inhibitor in great excess of suitable stabilizing amounts should be avoided.

As suggested hereinabove, many acyclic amido derivatives and urea derivatives may be used, provided only that the substituted compounds are substantially inert to the polymerizable material and to the catalyst precursor, which provide the desired end properties of the polymerizable composition as utilized in the polymerizing process of the invention. Of course, in confirming the inert character of such an inhibitor, the absence of any substantial deleterious effects on the other constituents of the polymerizable composition need be ascertained only in the presence of the small stabilizing amount of the inhibitor to be used, and over a period of time commensurate with the desired storage or pot life of the composition.

The catalyst precursors listed hereinabove are solids, and the gelation inhibitor compound utilized in accordance with the present invention also may be a solid at room temperature. While it may be possible to dissolve such solid ingredients in one or more of the polymerizable ingredients making up the epoxide or other polymerizable material utilized in the composition, it usually is more convenient for mixing purposes to provide the solid ingredients for the mixing operation already dissolved in a solvent. In fact, the use of a small amount of a solvent medium such as acetone or anisole often is convenient for introducing liquid additives miscible in the medium, as well as solid additives. It has been found that commercial propylene carbonate (a cyclic propylene ester of carbonic acid, probably identified as primarily 4-methyl-1,3-dioxolan-2-one) makes a particularly good solvent for the aromatic diazonium complex salts and also for the substituted ureas and acyclic amides, and the propylene carbonate so used is completely miscible with epoxy resins. For example, the propylene carbonate may make up approximately 1% to 2% by weight of the entire polymerizable composition. If desired to avoid substantially the disadvantages of utilizing an inert solvent medium, the total amounts of any solvents which do not participate in the polymerization reactions, including a solvent such as propylene carbonate and particularly any volatile solvents present, should be kept below about 4% by weight.

It may be desirable, however, to include in the composition an inert pigment of filler, which may be present in even a major proportion by weight, or small amounts of inert nonvolatile liquids such as mineral oil. Inclusion of such inert ingredients usually makes advisable a proportionate increase in the optimum amount of catalyst precursor used. Nevertheless, the precursor needed rarely exceeds 5% of the entire weight of the composition, an amount of the gelation inhibitor less than about 1% of the total weight usually is sufficient.

The following examples will serve further to illustrate the present invention.

Example 1

Several large batches were prepared by mixing together the following epoxides in the indicated proportions:

| Epoxide | Epoxy equiv. wt. | 25° C. viscosity, cps. | Parts by weight |
|---|---|---|---|
| Diglycidyl ether of bisphenol A | 172-178 | 4,000-6,000 | 20 (60.6%) |
| (3,4-Epoxycyclohexyl)-methyl 3,4-epoxycyclohexanecarboxylate | 131-143 | 350-450 | 10 (30.3%) |
| Alkyl glycidyl ether in which alkyl groups are predominantly dodecyl and tetradecyl | 286 | 8.5 | 3 (9.1%) |

A number of 350 gram samples were withdrawn from these batches, each sample containing very nearly 212 g., 106 g., and 31.8 g. respectively of the epoxide ingredients specified above. To each such sample were added 4.0 ml. of propylene carbonate, containing dissolved therein 2.45 g. of p-chlorobenzenediazonium hexafluorophosphate as the catalyst precursor. Several such samples, containing no additional materials, were observed as control samples, and viscosity measurements were made at 23° C. using a Brookfield viscometer. One such control sample had an initial viscosity, immediately after mixing, of 675 centipoises; at the end of 2 days the viscosity was 6,670 cps., and the sample had gelled in less than 7 days. Another such control sample had an initial viscosity of 685 cps., which rose to 9,800 cps. after 3 days, and this sample likewise had gelled before a week had passed.

Example 2

A 350 gram aliquot of the epoxide blend, as described in Example 1, and containing also 2.45 g. of the catalyst precursor dissolved in 4.0 ml. (4.8 g.) of propylene carbonate, was prepared as in Example 1, but with 0.16 g. (0.045% of the total weight) of N,N-dimethylacetamide dissolved additionally in the propylene carbonate before admixture with the epoxide blend. This sample (Sample 2A) had a viscosity of 880 centipoises as initially measured, and the Brookfield viscosity at 23° C. had increased to 1,630 cps. 6 days later, by which time a sample without the substituted acetamide would have gelled to the point of intractability.

Another sample (Sample 2B) was prepared similarly, but with 0.75 g. (0.21%) of N,N-dimethylacetamide introduced into the mixture in solution in the propylene carbonate. This sample was found initially to have a viscosity of 550 cps. After 7 days the viscosity was measured as being 1,380 cps.

Example 3

Another 350 g. aliquot, mixed as in Example 1 with the catalyst precursor added, was prepared, but with 0.50 g. (0.14%) of N,N-diethylacetamide introduced additionally into the mixture in solution (along with the p-chlorobenzenediazonium hexafluorophosphate) in the propylene carbonate. The viscosity of the mixture thus produced was measured at 885 cps. At the end of an 8 day period the viscosity had increased to 1,150 cps.

Example 4

To another aliquot of the formulation of Example 1 was added 0.83 g. (0.23%) of N,N-diethyl-m-toluamide incorporated in the preliminary propylene carbonate solution, providing a mixture which had a viscosity of 790 cps. At the end of a 6 day period the viscosity had increased to 1,255 cps.

Example 5

Another sample was prepared as in the preceding examples, but including, as the inhibitor dissolved in the propylene carbonate, 0.4 g. (0.11%) of N,N-dimethylacrylamide. From an initial viscosity at 23° C. of 675 cps., the viscosity rose after 2 days to 3,435 cps. as compared with 6,000–7,000 cps. in the same period in the absence of an inhibitor. A sizable increase in the proportion of this amide inhibitor tends to produce adverse effects during storage, notably with respect to the latent catalyst. Since the stabilizing activity of the dimethylacrylamide is not very great in the quantity used, the amides of the fatty acids generally are preferred.

Example 6

A sample prepared as in Example 1, but with 1.42 g. (0.40%) of N,N-dimethyloleamide introduced in solution with the propylene carbonate, had an initial viscosity of 600 cps. At the end of 1 week the viscosity was 1,555 cps.

Example 7

The sample in this test contained 1.39 g. (0.39%) of solid N-ethyl-N-(1-naphthyl)acetamide dissolved in the propylene carbonate as the gelation inhibitor, and had a viscosity initially of 670 cps. After 3 days the viscosity had risen to 1,100 cps., and the formulation still had not gelled after standing for a week.

Example 8

Three 350 g. aliquots were withdrawn, as above, from a batch of the epoxide blend of Example 1. Sample 8A was prepared by dissolving in the 4.0 ml. of propylene carbonate solvent 0.083 g. (0.023%) of 1,1,3,3-tetramethylurea, as well as the 2.45 g. of p-chlorobenzenediazonium hexafluorophosphate, then mixing with one of the 350 g. epoxide aliquots. Sample 8B was prepared in the same manner, but using 0.33 g. (0.092%) of the tetramethylurea, while sample 8C contained 1.00 g. (0.28%) of the tetramethylurea. Brookfield viscometer measurements at 23° C. on the three samples directly after mixing, and later after the passage of a 7 day period, gave the following results:

| Sample No. | Tetramethylurea added, g. | Initial viscosity, cps. | Viscosity after 7 days, cps. |
|---|---|---|---|
| 8A | 0.083 | 620 | 3,525 |
| 8B | 0.33 | 605 | 1,325 |
| 8C | 1.00 | 605 | 930 |

Example 9

The test of Example 8 was repeated, using instead 0.40 g. (0.11%) of 1,1,3,3-tetraethylurea as the gelation inhibitor. From an initial viscosity of 555 cps. the viscosity had risen, after 4 days, to 2,360 cps.

Example 10

Still another 350 g. epoxide aliquot was used, as in the preceding examples, but with 0.40 g. of solid N,N'-dimethylcarbanilide dissolved in the propylene carbonate as the inhibitor. Starting with an initial viscosity of 620 cps., the sample after 4 days had a viscosity of 2,500 cps.

Example 11

Using the same latent-catalyzed sample proportions, but with 0.40 g. of solid 1,1'-carbonyldipiperidine dissolved in the propylene carbonate, the initial viscosity of 640 cps. increased, after 6 days, to 1,955 cps.

Example 12

Using again the same amounts of sample ingredients, but with 0.40 g. of solid 1,3,4,6-tetrachloroglycoluril dissolved in the propylene carbonate as the inhibitor, the formulation had an initial viscosity of 600 cps. After 6 days the viscosity had increased to 2,865 cps.

Numerous further tests were carried out to ascertain that, in general, the compositions of the types described hereinabove, containing the acyclic amide compound or the substituted urea compound as gelation inhibitor, can be utilized readily for forming desired shapes, at any time during the entire period after mixing during which the viscosity of the composition remains within the practical limits for the desired forming or shaping operation, and that activation of the latent catalyst then can be effected by ultraviolet light irradiation to release the Lewis acid catalyst, without any noticeable interference with the shaping or initiating operations due to the presence of the gelation inhibitor.

Thus, referring to Sample 2A prepared as described in Example 2, a portion of that sample was removed after aging for about 48 hours and coated on paperboard, using a drawbar to provide a coating of the order of 0.0005 inch thick when dry. After exposure for 5 seconds to a 360-watt high pressure mercury lamp at a distance of 3 inches, the coated film was found to have cured to a tough, solid finish. This indicated that the presence of the N,N-dimethylacetamide did not interfere with the coating or polymerization-initiating operations. Indeed, similar operations can be performed after further aging, although by the end of the 6-day period during which this sample was tested its viscosity was becoming rather high for the use of some coating techniques. It is noteworthy, by contrast, that the viscosity of the control sample mentioned in connection with Example 1, containing no gelation inhibitor, already had reached a level so high as to be intractable for most coating operations after a period of 2 days.

Referring further to the sample containing N,N-diethylacetamide prepared as described in Example 3, a portion of that composition which had been aged for a period of 8 days, as mentioned in connection with Example 3, was used to form a coating on paperboard, following the procedure just mentioned with respect to Sample 2A. Again, after similar irradiation for 5 seconds, the coating was found to have polymerized to a tough, solid finish.

As described hereinabove with respect to Examples 6 and 7, the samples containing respectively N,N-dimethyloleamide and N-ethyl-N-(1 - naphthyl)acetamide as gelation inhibitors were stored for a period of 1 week without excessive increases in viscosity. A portion of the sample of Example 6 was removed after 3 days following mixing and was applied to paperboard to form a coating, as described hereinabove. Exposure similarly to ultraviolet light for 5 seconds caused the coating to harden to a slightly tacky finish. The same results were obtained using a portion of the sample of Example 7 removed after aging for 3 days.

In a further test, using the same procedures for coating and exposure to ultraviolet light radiation from the mercury lamp, a sample quite similar to Sample 8B of Example 8, and containing 0.4 gram of tetramethylurea, was tested after aging for 5 days. Again, the coating had hardened, after irradiation for 5 seconds, to a slightly tacky finish.

In view of their availability and effectiveness, preferred gelation inhibitors for incorporation in the stabilized polymerizable compositions of the invention are tetraalkyl-substituted ureas and N,N-dialkyl-substituted acetamides. Although 1,1,3,3 - tetramethylurea and N,N-dimethylacetamide are well suited for this purpose, it will be appreciated from the discussion and examples hereinabove that other alkyl groups, including the higher alkyls, may replace some or all of the methyl groups in these preferred alkyl-substituted inhibitor compounds. As further indicated hereinabove, the N,N-dialkyl derivatives of other acyclic amides (excluding formamide) also may be used with particular advantage in these compositions. It will be seen that N,N-disubstituted (such as N,N-dimethyl) amides having an alkyl group (such as methyl or ethyl) or an aryl group (such as phenyl or tolyl) on the amido carbon atom may be used advantageously.

While there have been described particular embodiments of the invention, including those at present considered to be the preferred embodiments, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A stabilized polymerizable composition, comprising:
   a monomeric or prepolymeric epoxide material polymerizable to higher molecular weights through the action of a cationic catalyst;
   a radiation-sensitive catalyst precursor which decomposes upon application of energy to provide a Lewis acid effective to initiate polymerization of said polymerizable material, said precursor being an aromatic diazonium salt of a complex halogenide;
   and a stabilizing amount of a gelation inhibitor for counteracting prematurely formed Lewis acid, said inhibitor being an amide having an acyclic amido group, or a urea derivative, wherein the amido group

and the urea nitrogen atoms

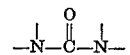

are free of unsubstituted hydrogen, and said stabilizing amount of the inhibitor being substantially inert to said polymerizable material and said catalyst precursor.

2. The composition of claim 1, in which said catalyst precursor is present in an amount equal to between about 0.5% and about 5% of the weight of said polymerizable material present in the composition.

3. The composition of claim 1, in which said gelation inhibitor is an N,N-disubstituted amide having an alkyl or aryl group on the amido carbon atom.

4. The composition of claim 1, in which said gelation inhibitor is an N,N-dialkyl-substituted acetamide.

5. The composition of claim 4, in which the gelation inhibitor is N,N-dimethylacetamide.

6. The composition of claim 1, in which said gelation inhibitor is a 1,1,3,3-tetrasubstituted urea.

7. The composition of claim 1, in which said gelation inhibitor is a tetraalkyl-substituted urea.

8. The composition of claim 7, in which the gelation inhibitor is 1,1,3,3-tetramethylurea.

9. The composition of claim 1, in which the gelation inhibitor is N,N'-dimethylcarbanilide.

10. The composition of claim 1, in which the gelation inhibitor is 1,1'-carbonyldipiperidine.

11. The composition of claim 1, in which the gelation inhibitor is 1,3,4,6-tetrachloroglycoluril.

12. The composition of claim 1, in which said gelation inhibitor is present in an amount by weight equal to between about 0.005% and about 1% of the weight of the composition.

13. The composition of claim 1, in which the total amount of any unpolymerizable volatile solvents present in said composition is less than about 4% by weight of the composition.

14. A stabilized polymerizable composition, comprising:
a liquid monomeric or prepolymeric epoxide material polymerizable to higher molecular weights through the action of a cationic catalyst;
an aromatic diazonium salt of a complex halogenide which decomposes upon application of energy to provide a halide Lewis acid effective to initiate polymerization of said epoxide material, said salt being present in an amount equal to between about 0.5% and about 5% of the weight of said epoxide material present in said composition;
and a gelation inhibitor for counteracting prematurely formed Lewis acid, said inhibitor being selected from the group consisting of N,N-dialkyl-substituted acetamides and tetraalkyl-substituted ureas and being present in an amount by weight equal to between about 0.005% and about 1% of the weight of said composition.

15. The composition of claim 14, in which the total amount of any unpolymerizable volatile solvents present in said composition is less than about 4% by weight of the liquid composition.

16. The process of polymerizing a monomeric or prepolymeric epoxide material polymerizable to higher molecular weights through the action of a cationic catalyst, comprising:
forming a mixture of the polymerizable epoxide material, a radiation-sensitive catalyst precursor, said precursor being an aromatic diazonium salt of a complex halogenide, which decomposes upon application of energy to provide a Lewis acid effective to initiate polymerization of said polymerizable material, and also a stabilizing amount of a gelation inhibitor for counteracting prematurely formed Lewis acid, said inhibitor being an amide having an acyclic amido group, or a urea derivative, wherein the amido group

and the urea nitrogen atoms

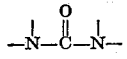

are free of unsubstituted hydrogen, and said stabilizamount of the inhibitor being substantially inert to said polymerizable material and said catalyst precursor;

and subsequently applying energy to the resulting mixture to release said Lewis acid in sufficient amounts to effect substantial polymerization of the polymerizable material.

17. The process of claim 16, in which said catalyst precursor is mixed with said polymerizable material in an amount equal to between about 0.5% and about 5% of the weight of the polymerizable material.

18. The process of claim 16, in which said gelation inhibitor mixed with the polymerizable material and the catalyst precursor is selected from the group consisting of N,N-dialkyl-substituted acetamides and tetraalkyl-substituted ureas.

19. The process of claim 16, in which said gelation inhibitor is an N,N-disubstituted amide having an alkyl or aryl group on the amido carbon atom.

20. The process of claim 16, in which said gelation inhibitor is an N,N-dialkyl-substituted acetamide.

21. The process of claim 20, in which the gelation inhibitor is N,N-dimethylacetamide.

22. The process of claim 16, in which said gelation inhibitor is a 1,1,3,3-tetrasubstituted urea.

23. The process of claim 16, in which said gelation inhibitor is a tetraalkyl-substituted urea.

24. The process of claim 23, in which the gelation inhibitor is 1,1,3,3-tetramethylurea.

25. The process of claim 16, in which the gelation inhibitor is N,N'-dimethylcarbanilide.

26. The process of claim 16, in which the gelation inhibitor is 1,1'-carbonyldipiperidine.

27. The process of claim 16, in which the gelation inhibitor is 1,3,4,6-tetrachloroglycoluril.

28. The process of claim 16, in which said gelation inhibitor is mixed with said polymerizable material and said catalyst precursor in an amount equal to between about 0.005% and about 1% of the weight of the resulting mixture.

29. The process of claim 16, in which said mixture formed of the polymerizable material, the catalyst precursor, and the gelation inhibitor contains less than about 4% by weight of any unpolymerizable volatile solvents which may be present therein.

References Cited
UNITED STATES PATENTS 3,295,974   1/1967   Erdmann _____ 96—115 R
3,205,157   9/1965   Licari _____ 96—91 R MURRAY TILLMAN, Primary Examiner
R. B. TURER, Assistant Examiner U.S. Cl. X.R.

96—75, 91 R, 115 P; 117—93.31, 132 BE, 155 R; 260—24, 2 EP, 47 EP, 78.3, 94.9 GA, 343.6, 343.9, 348 C, 348 R, 830 TW; 204—159.14, 159.22, 159.24